United States Patent [19]
Forney

[11] 4,427,022
[45] Jan. 24, 1984

[54] APPARATUS FOR ADJUSTING SIMULTANEOUSLY FLUID PRESSURE IN A PLURALITY OF PRESSURE VESSELS

[75] Inventor: Victor D. Forney, Bakersfield, Calif.

[73] Assignee: Eugene A. Frost, Bakersfield, Calif.

[21] Appl. No.: 962,911

[22] Filed: Nov. 22, 1978

[51] Int. Cl.³ .............................................. G05D 16/00
[52] U.S. Cl. ................................... 137/224; 137/231; 137/614.03; 137/613
[58] Field of Search ........... 137/223, 225, 224, 614.03, 137/614.04, 613, 231

[56] References Cited

U.S. PATENT DOCUMENTS

| | | | |
|---|---|---|---|
| 2,428,637 | 10/1947 | Scheiwer | 137/614.04 |
| 2,545,796 | 3/1951 | Scheiwer | 137/614.04 |
| 2,587,539 | 2/1952 | Seaman | 137/613 X |
| 2,685,906 | 8/1954 | Williams | 137/224 X |
| 3,073,342 | 1/1963 | Magorien | 137/614.03 |
| 3,194,254 | 7/1965 | Zmek | 137/613 X |

FOREIGN PATENT DOCUMENTS 437108  10/1935  United Kingdom ................ 137/225

*Primary Examiner*—Alan Cohan
*Attorney, Agent, or Firm*—Jack M. Wiseman

[57] ABSTRACT

Apparatus for adjusting simultaneously fluid pressure in a plurality of pressure vessels comprising a compressor. Communicating with the compressor through a relay valve is a manifold. A plurality of hoses communicate with the manifold and are connected simultaneously to the valve stems of a plurality of tires through respective valve stem connectors. The relay valve is normally opened for the flow of fluid under pressure from the compressor to the manifold. The relay valve is controlled through a regulator to close when sensing a preselected back fluid pressure from the tires through the manifold. Under-inflated tires will receive fluid under pressure from the compressor through the relay valve and the manifold. When the tires reach a preselected fluid pressure, the relay valve senses the tires reaching the preselected fluid pressure and the relay valve closes to shut-off the flow of fluid under pressure from the compressor through the relay valve. Overinflated tires will have fluid under pressure flow from the tires through the manifold and to the relay valve. When the tires reach a preselected fluid pressure, the relay valve senses the tires reaching the preselected fluid pressure and the relay valve closes to shut-off the flow of fluid under pressure from the manifold to the relay valve. Through the use of a manifold, the fluid under pressure will be equalized and balanced in each of the tires communicating with the manifold.

8 Claims, 5 Drawing Figures

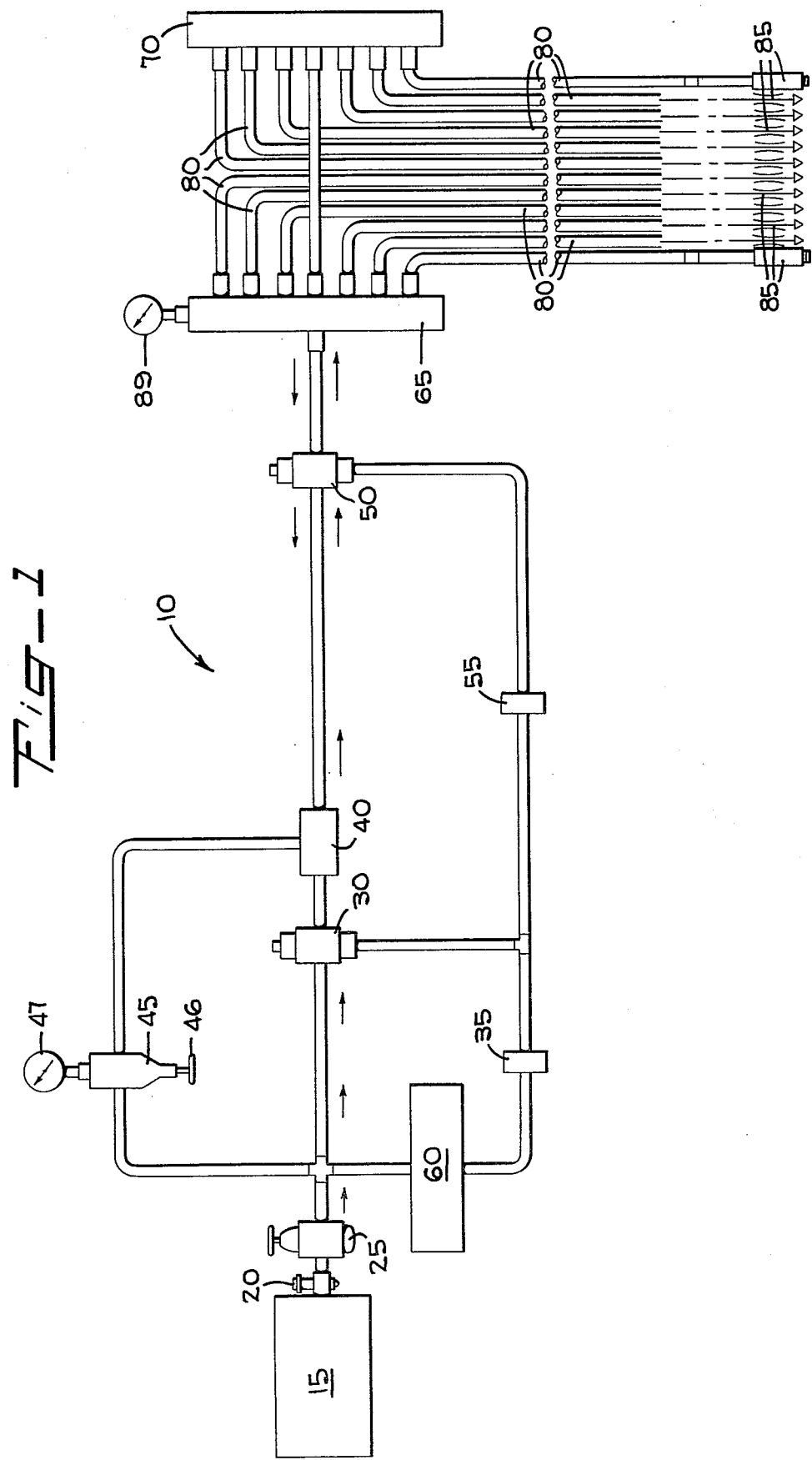

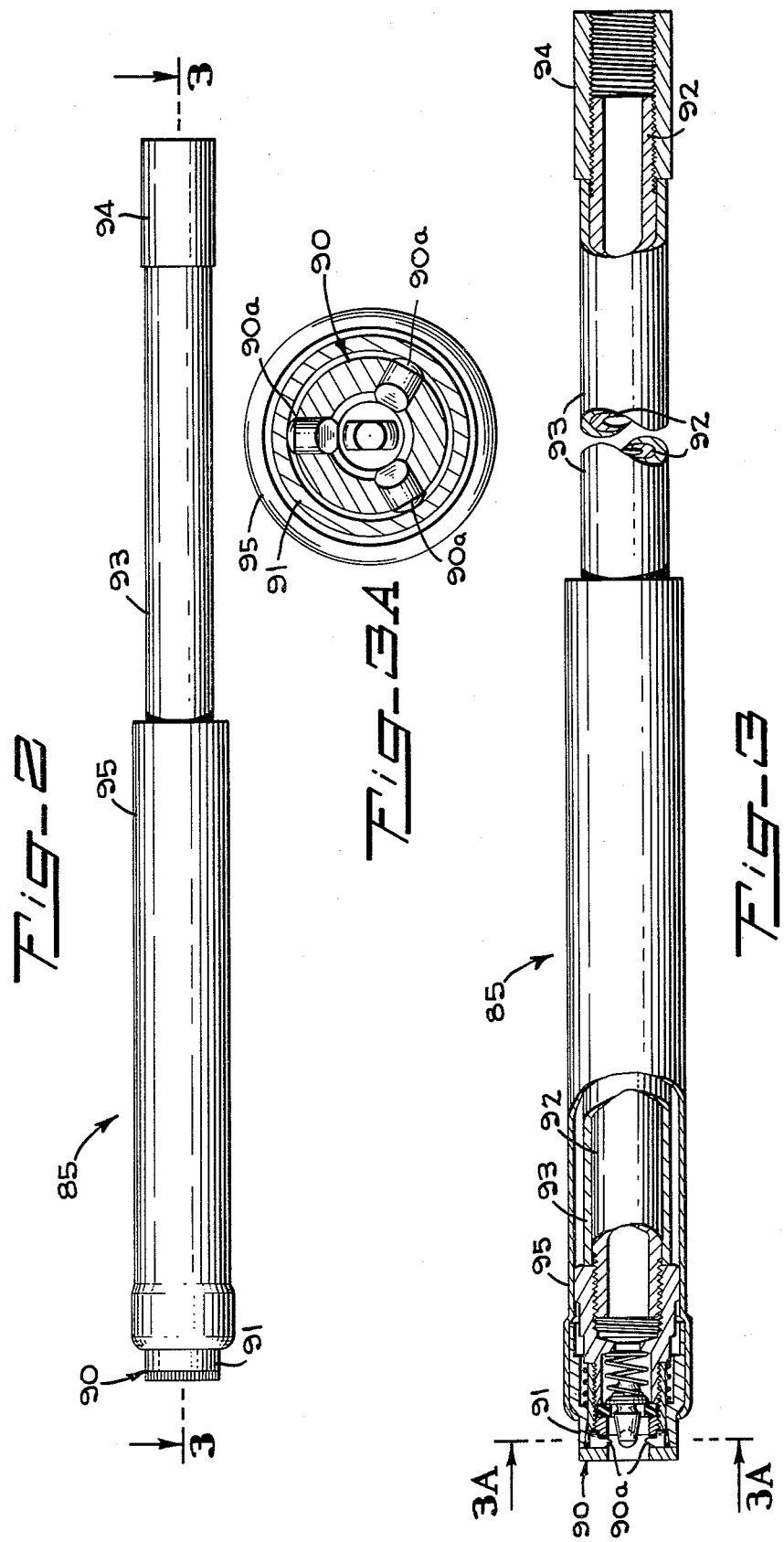

APPARATUS FOR ADJUSTING SIMULTANEOUSLY FLUID PRESSURE IN A PLURALITY OF PRESSURE VESSELS

BACKGROUND OF THE INVENTION

The present invention relates in general to apparatus for adjusting fluid pressure in pressure vessels, and more particularly to apparatus for adjusting simultaneously fluid pressure in a plurality of pressure vessels.

In the patent to Holbrook et al., U.S. Pat. No. 2,989,999, there is disclosed a system for controlling remotely the pressure of fluid in a plurality of inflatable members. The system comprises a manually adjusted control valve, which receives fluid under pressure. The control valve provides fluid under pressure at a preselected pressure to a cut-off valve. Fluid under pressure flows through the cut-off valve to a selection valve. The outlet port of the selection valve communicates with tire inflation control valves. Each of the tire inflation control valves is mounted on a respective wheel for controlling the fluid pressure in its associated inflatable tire. Each tire inflation control valve enables the fluid pressure of its associated tire to be inflated or deflated to the control valve pressure. The patent to Whaleby et al., U.S. Pat. No. 2,989,989, is similar to the patent to Holbrook et al.

The patent to Gaiptman, U.S. Pat. No. 2,577,458, discloses apparatus for regulating air pressure in automobile tires in which air inlet valves maintain a desired air pressure in tires and air pressure control valves release excessive air pressure from the tires. The patent to Jakobsen, U.S. Pat. No. 3,928,711, discloses a manifold system for maintaining pressurized air in underground cables to prevent the penetration of moisture or the like in the underground cables. Connecting hoses extend from a manifold to respective underground cables to replenish the air pressure in the underground cables. Air under pressure is supplied to the manifold from a source of air under pressure.

SUMMARY OF THE INVENTION

Apparatus for adjusting simultaneously fluid pressure in a plurality of pressure vessels comprising a source of fluid under pressure. The source of fluid under pressure communicates with a plurality of pressure vessels through a reservoir. In the flow path of the fluid under pressure between the source of fluid under pressure and the reservoir is a valve. The valve is initially opened for fluid under pressure to flow from the source of fluid under pressure to the reservoir. The valve is controlled by a device to close upon sensing a preselected back fluid pressure from the pressure vessels through the reservoir, when the fluid pressure in the pressure vessels reach the preselected fluid pressure.

A feature of the present invention is the employment of a relay valve for the reduction of time required to inflate or deflate a plurality of pressure vessels.

Another feature of the present invention is the employment of a manifold to maintain in all the pressure vessels an equalized fluid pressure to provide a balanced fluid pressure system.

Another feature of the present invention is the employment of an elongated valve stem connector for each pressure vessel individually, which is manually operated for self-locking with the associated valve stem and which includes a fluid flow tube extending coaxially from a valve stem actuator for facilitating the installation thereof on a pressure vessel.

By virtue of the present invention, the time required for the balancing of air pressure for all the tires of a trailer and cab has been reduced by a considerable amount.

The apparatus of the present invention serves to provide the following beneficial results and advantages:

1. Enables the balance of air pressure in a plurality of tires simultaneously over a reduced time period;
2. Automatically reduces air pressure in tires to a desired pressure or brings air pressure in tires up to a desired pressure;
3. Easy to install and operate;
4. Has improved accuracy;
5. Provides greater safety through a lock-on valve stem connector and does not require the attention of operators during the inflating and deflating of the tires;
6. Provides a valve stem connector that reduces hook-up time and reaches the inside dual tire with facility.

DESCRIPTION OF THE DRAWINGS

FIG. 1 is a diagrammatic illustration of the apparatus embodying the present invention.

FIG. 2 is a longitudinal elevation view of a valve stem connector employed in the apparatus of the present invention.

FIG. 3 is an axial sectional view taken along line 3—3 of FIG. 2.

FIG. 3A is a vertical sectional view, partially in elevation taken along line 3A—3A of FIG. 3.

DESCRIPTION OF THE PREFERRED EMBODIMENT

Figure 4:
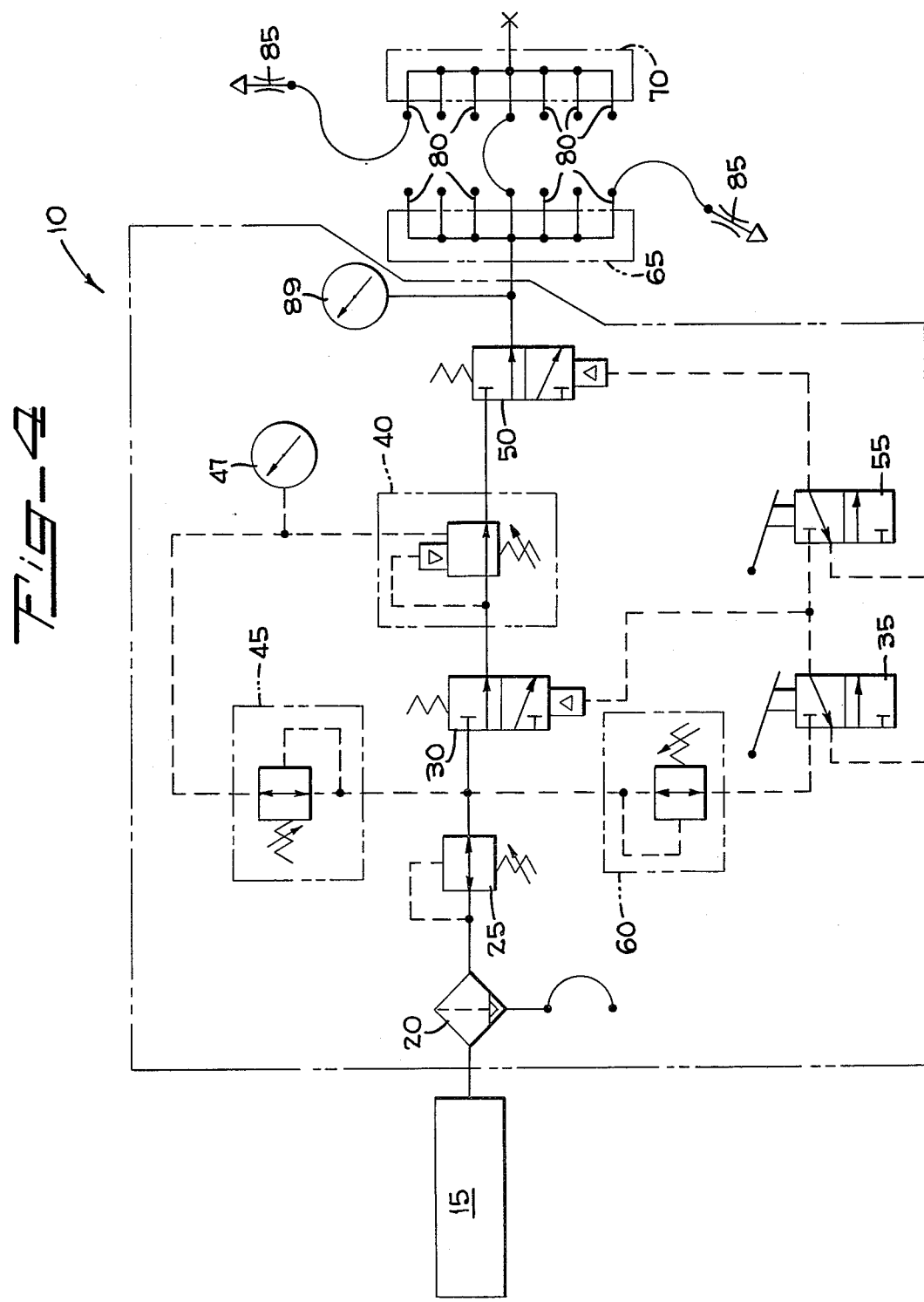
FIG. 4 is a schematic diagram of the apparatus shown in FIG. 1.

Illustrated in FIGS. 1 and 4 is the apparatus 10 of the present invention for adjusting simultaneously fluid pressure in a plurality of pressure vessels, such as vehicle tires. Such vehicle tires are conventionally provided with valve stems through which the tire may be deflated or inflated by the actuation of a pin in the valve thereof.

The apparatus 10 comprises a suitable source of fluid under pressure, such as air compressor 15. Communicating with the discharge port of the compressor 15 is a suitable filter and water trap 20. The filter and water trap 20 is of the type manufactured by Coilhose Pneumatics of Middlesex, N.J., as Model No. 8824D. The filter and water trap 20 includes a pop-up indicator that indicates the need for cleaning the filter section. Trapped water is automatically drained by an overflow conduit before a critical contamination level is reached. Thus, the filter and water trap 20 removes contaminants before such contaminants can advance with the flow of fluid to contaminate sensitive components of the apparatus 10 or the valve stems of the vehicle tires.

Fluid under pressure, such as air, advances through the filter and water trap 20 into a primary regulator 25. The primary regulator 25 is of the type manufactured by the Wabco Fluid Power Division of American-Standard located at Lexington, Ky., as the "S" Pressure Regulator. The Regulator 25 is a three-way valve that is normally opened and self-regulating. It is the function of the primary regulator 25 to limit the apparatus 10 to a preselected range of fluid pressure and to assure uniform air pressure for the fluid under pressure advancing therethrough. In the preferred embodiment, the regulator 25 limits the apparatus 10 to a maximum fluid pressure of 125 p.s.i. and a minimum fluid pressure of 5 p.s.i. Should the compressor 15 discharge from its outlet port fluid under pressure outside of the preselected range for which the regulator 25 is set, then the regulator 25 will close and shut-off the flow of fluid under pressure therethrough. Thus, the regulator 25 serves as a fail-safe device to prevent the blow out of vehicle tires by reducing malfunctions in the components of the apparatus 10.

The outlet port of the primary regulator 25 communicates with the inlet port of an on-off valve 30. The on-off valve 30 is a three-way valve, such as a valve manufactured by Kay Pneumatics of Commack, N.Y., Model No. 48CS-30-40. For operatively controlling the three-way valve 30, a miniature pilot valve 35 with a selector switch for the on-off mode is provided. With the switch in the ON position, the valve 30 is opened and fluid under pressure advances through the primary regulator 30 into an inlet port of a sequencing or relay valve 40. With the switch selector in the OFF position, the valve 30 is closed to shut-off the supply of fluid under pressure to the inlet port of the relay valve 40. The pilot valve 35 is of the type manufactured by Kay Pneumatics of Commack, N.Y., as KV45-3, Series B, Catalog No. 800T-H2.

The relay valve 40 is a WABCO relay valve manufactured by the WABCO division of American-Standard of Lexington, Ky., and is identifiable as a type "S" relay valve, P55161. The relay valve 40 has a spring loaded plunger. The relay valve 40 is normally opened and closes when the back or return fluid pressure entering its outlet port reaches a preselected magnitude.

Communicating with the relay valve 40 is a suitable control regulator 45, which communicates with the primary regulator 25 through its inlet port and through the outlet port of the regulator 25. The control regulator 45 is of the type manufactured by the WABCO Fluid Power Division of American-Standard of Lexington, Ky., as Type 4S, P55125, press regulator. The control regulator 45 includes a control knob 46. By adjusting the control knob 46, the fluid pressure for the vehicle tires is selected. The range of fluid pressure, in the exemplary embodiment, from which the knob 46 may be adjusted to select the preselected fluid pressure is between 0 p.s.i. and 125 p.s.i. A gauge 47 of the regulator 45 indicates the preselected fluid pressure set by the knob 46 and flowing from the regulator 45 to the relay valve 40.

The control regulator 45 communicates with the control port of the relay valve 40 and sets the back or return shut-off pressure for the relay valve 40. The control regulator 45 does not regulate fluid flow, but it does control the relay valve 40 so that the relay valve 40 will close upon sensing a back or return fluid pressure of a magnitude preselected by the control regulator 45. Thus, the closing of the relay valve 40 is controlled by the control regulator 45 and the magnitude at which the relay valve 40 closes upon sensing the back fluid pressure reaching a preselected magnitude is controlled by the control regulator 45. The relay valve 40 is piston operated. Hence, the relay valve 40 is pre-loaded by the fluid pressure from the outlet port of the regulator 45 to close when the relay valve 40 senses a back fluid pressure reaching the predetermined fluid pressure preselected by the regulator 45.

Communicating with the outlet port of the relay valve 40 is a test-charge valve 50, which is similar to the above-described three-way valve 30. Communicating with the test-charge valve 50, which is a three-way valve, is a miniature pilot valve 55. The pilot valve 55 has a selector lever. Moving the selector lever of the pilot valve 55 in one direction to test causes the shutting-off of the flow of fluid under pressure through the valve 50. Moving the selector lever of the pilot valve 55 in another direction to charge opens the control valve 50 for the flow of fluid under pressure therethrough for inflating and deflating tires. A conventional miniature regulator 60 serves to reduce pilot fluid pressure applied to the miniature pilot valves 35 and 55. The pilot valve 55 is similar to the above described pilot valve 35.

The outlet port of the control valve 50 communicates with a fluid reservoir, such as a manifold 65, which, in turn, communicates with a reservoir, such as manifold 70. Communicating with the outlet ports of the manifolds 65 and 70 are suitable fluid flow conduits, such as hoses 80. The hoses 80 are connected to the valve stems of vehicle tires, respectively, through the respective valve stem connectors 85 (FIGS. 2 and 3). Communicating with the manifolds 65 and 70 is a gauge 89, which indicates the pressure of the fluid in the manifolds 65 and 70.

Through the use of the manifolds 65 and 70, a balanced fluid pressure is maintained in all the vehicle tires connected to the hoses 80 during the operation of the apparatus 10, since there is a common reservoir of fluid under pressure communicating concurrently with the vehicle tires. Thus, the fluid pressure for all the tires connected to the hoses 80 during the operation of the apparatus 10 is equalized.

Initially, the compressor 15 is operated and the control valve 30 is opened by the pilot valve 35 through the moving of the pilot valve 35 switch to on position. The relay valve 40 is opened and is controlled by the control regulator 45 to close upon sensing the back fluid pressure from the manifolds 65 and 70 reaching a preselected magnitude. Test-charge valve 50 is opened by moving the pilot valve 55 selector switch to charge. The valve stem connectors 85 are now hooked-up to the valve stems of the tires, respectively. With the valves 30, 40 and 50 opened, fluid under pressure within a preselected pressure range flows from the compressor 15, through the filter-water trap 20, through the regulator 25, through the control valve 30, through the relay valve 40, through the control valve 50, and through the manifolds 65 and 70.

The fluid under pressure contained in the manifolds is applied concurrently to the vehicle tires through the valve stems of the vehicle tires, the valve stem connectors 85 and fluid conduits 80. Thus, a balanced, equalized fluid under pressure is present in all the tires connected to the connectors 85 during the use of the apparatus 10, since the vehicle tires are communicating with each other and the manifolds 65 and 70, while respectively connected to the valve stem connectors and the hoses 80.

Fluid under pressure also flows from the vehicle tires concurrently to the manifolds 65 and 70 through the valve stem connectors 85 and the hoses 80. From the manifolds 65 and 70 there is a return path for the fluid under pressure through the three-way valve 50 to the relay valve 40. When the fluid under pressure in the vehicle tires is under a pressure less than the preselected pressure for closing the relay valve 40, the vehicle tires are inflated until the relay valve 40 senses a back or return fluid pressure equal to the preselected pressure selected through the regulator 45. When the relay valve 40 senses a back or return fluid pressure equal to the preselected pressure, the relay valve 40 closes to shut-off the flow of fluid under pressure from the compressor 15 and to maintain the fluid pressure in the manifolds 65 and 70. Thereupon, an operator removes the valve stem connectors 85 from the valve stems of the vehicle tires and the apparatus 10 is ready for the next vehicle. The preselected pressure is the pressure selected by the adjustment of the knob 46 of the regulator 45. The manifolds 65 and 70 maintain a constant pressure in the vehicle tires until the valve stem connectors 85 are removed from the valve stems of the vehicle tires.

When the fluid under pressure in the tires is under a fluid pressure greater than the preselected pressure for closing the relay valve 40, the tires are deflated through the valve stem connectors 85 actuating the pins of the associated valves. When the relay valve 40 senses a back or return pressure through the manifolds 65, 70 and the three-way valve 50 reaching the preselected fluid pressure selected by the regulator 45, the relay valve 40 closes to shut-off the flow of fluid under pressure from the manifolds 65 and 70 and to shut-off the flow of fluid from compressor 15 to the manifolds 65 and 70. Thereupon, an operator removes the valve stem connectors 85 from the valve stems of the tires and the apparatus 10 is ready for the next vehicle. The fluid under pressure in the manifolds 65 and 70 maintains a constant pressure in the vehicle tires until the valve stem connectors are removed. To confirm proper fluid pressure in the vehicle tires, turn the pilot valve 55 selector switch to test. When the gauge 89 reads the same as gauge 47, the tires are properly pressurized.

By virtue of the relay valve 40, the time for inflating or deflating a plurality of pressure vessels, such as tires, has been reduced significantly. Further the fluid pressure in each of the pressure vessels is balanced and equal, since all the pressure vessels during inflation or deflation are constantly in communication with one another through the manifolds 65 and 70.

Illustrated in FIGS. 2 and 3 is the valve stem connector 85 which comprises a conventional valve stem actuator 90 having a central longitudinal bore. The valve stem actuator 90 is disposed within a concentric locking sleeve 91 that is urged forwardly relative to the actuator by a spring 96 which is positioned between a shoulder on the actuator and a shoulder on the sleeve. The actuator 90 has a spring loaded central projection 90b and a plurality of locking pins 90a surrounding the bore of the actuator. The locking pins 90a are radially movable in the forward end of the connector 85.

To operatively position a connector 85 on the valve stem of a tire, the locking sleeve 91 is first slid rearwardly on the actuator 90 against the urging of the spring 96. Then the outer end of the connector 85 is brought into engagement with the end of a valve stem of a tire to cause the end of the valve stem to engage the radially-inner ends of the three locking pins 90a and cam them outwardly. The central projection 90b of the actuator 90 engages the valve pin in the valve stem, opens the valve, and moves the central projection 90b off its seat to establish flow communication with the internal passage of the connector.

When the valves have been opened, the operator releases the locking sleeve 91, permitting it to move forwardly under the urging of spring 96 to engage the rounded outer ends of the locking pins 90a and cam the pins inwardly to lock the valve stem in the connector.

Connected to the valve stem actuator 90 by threaded engagement therewith is a suitable extension tube 92 through which flows fluid under pressure. The free end of the tube 92 has an increased diameter portion in the form of a threaded cap 94. The tube 92 is loosely received by an outer coaxial tube 93. Partially surrounding the actuator 90, the sleeve 91, the fluid passage tube 92 and the outer tube 93 is a tubular member 95. The tubular member 95 fits tightly on the locking sleeve 91 to retain it in a fixed position therewith. Also, the tubular member 95 receives freely the outer tube 93. When the connector is positioned on a valve stem, the operator may grip the increased diameter portion 95 of the fluid passage tube 92 to move it toward the valve stem of the tire. Through the arrangement heretofore described, an extension is provided for facilitating the installation of the connector 85 to the valve stem of a vehicle tire.

I claim:

1. Apparatus for simultaneously controlling the fluid pressure in a plurality of vessels comprising:
   (a) a source of fluid under pressure;
   (b) a reservoir for containing fluid under pressure;
   (c) means communicating with said reservoir and said source of fluid under pressure for providing a flow of fluid under pressure between said source of fluid under pressure and said reservoir;
   (d) a plurality of conduits communicating with said reservoir for conducting fluid under pressure between said reservoir and the plurality of pressure vessels;
   (e) said means comprising a normally opened valve disposed between said reservoir and said source of fluid under pressure, said valve being operative to shut-off the flow of fluid under pressure in said means in response to detecting a preselected fluid pressure from fluid flowing away from said reservoir and toward said valve; and
   (f) a first regulating device communicating with said valve for controlling the operation of said valve, whereby said valve closes in response to detecting a preselected fluid flowing away from said reservoir and toward said valve, said valve being a relay valve,
   (g) said means comprises a second regulating device disposed between said source of fluid pressure and said relay valve for controlling the range of the fluid pressure of the fluid under pressure flowing from said source of fluid under pressure.

2. Apparatus as claimed in claim 1 wherein said means comprises an on-off valve disposed between said relay valve and said second regulating device for at times enabling the flow of fluid under pressure from said source of fluid under pressure to said relay valve and at other times interrupting the flow of fluid under pressure from said source of fluid under pressure to said relay valve.

3. Apparatus as claimed in claim 2 wherein said means comprises a charge-test valve disposed betwen said relay valve and said reservoir for at times enabling the flow of fluid under pressure between said reservoir and said relay valve for the inflation or deflation of said pressure vessels and at other times interrupting the flow of fluid under pressure between said reservoir and said relay valve for the comparison of the fluid pressure in said reservoir with the preselected fluid pressure controlled by said first regulator.

4. Apparatus as claimed in claim 3 and comprising a gauge communicating with said first regulating device for indicating the preselected fluid pressure controlled by said first regulating device and a gauge communicating with said reservoir for indicating the fluid pressure of the fluid contained by said reservoir, said gauges indicating said comparison of the fluid pressure in said reservoir and the preselected fluid pressure controlled by said first regulator to test the accuracy of the fluid pressure in the pressure vessels.

5. Apparatus as claimed in claim 4 wherein said means comprises a filter-water trap disposed between said source of fluid under pressure and said second regulating device for removing contaminants in the fluid under pressure.

6. Apparatus as claimed in claim 3 and comprising:
   (a) a first pilot valve with a selector communicating with said on-off valve for controlling the operation of said on-off valve, whereby the movement of the selector of said first pilot valve in one direction opens said on-off valve and the movement of the selector of said first pilot valve in another direction closes said on-off valve;
   (b) a second pilot valve with a selector communicating with said charge-test valve for controlling the operation of said charge-test valve, whereby the movement of the selector of said second pilot valve in one direction opens said charge-test valve and the movement of the selector of said second pilot valve in another direction closes said charge-test valve; and
   (c) a regulating device communicating with said first and second pilot valves for selecting the range of fluid pressure under which said first and second pilot valves are operated.

7. Apparatus simultaneously controlling the fluid pressure in a plurality of pressure vessels comprising:
   (a) a source of fluid under pressure;
   (b) a reservoir for containing fluid under pressure;
   (c) means communicating with said reservoir and said source of fluid under pressure for providing a flow of fluid under pressure between said source of fluid under pressure and said reservoir;
   (d) a plurality of conduits communicating with said reservoir for conducting fluid under pressure between said reservoir and the plurality of pressure vessels;
   (e) said means comprising a normally opened valve disposed between said reservoir and said source of fluid under pressure, said valve being operative to shut-off the flow of fluid under pressure in said means in response to detecting a preselected fluid pressure from fluid flowing away from said reservoir and toward said valve; and
   (f) a plurality of valve stem connectors communicating with said conduits, respectively, each of said valve stem connectors comprising:
   (g) a valve stem actuator having a bore with radially movable projections surrounding said bore;
   (h) means in which said valve stem actuator is freely and coaxially disposed;
   (i) a spring disposed between said valve stem actuator and said means for spring loading said actuator relative to said means; and
   (j) an elongated fluid passage tube connected to and extending from said valve stem actuator coaxialy therewith, whereby said means is retained in position and said fluid passage tube is moved axially to lock said actuator in position through said radially movable projections and to actuate the valve of the valve stem to open the valve of the valve stem.

8. Apparatus as claimed in claim 7 wherein said fluid passage tube has an increased diameter portion at the free end thereof and said valve stem connector further comprises a tube disposed in axial alignment with said fluid passage tube and said means, said last-mentioned tube being disposed between said means and said fluid passage tube, said last-mentioned tube extending between said valve stem actuator and said increased diameter portion of said fluid passage tube.

* * * * *